United States Patent [19]

Harrison et al.

[11] Patent Number: 4,526,215
[45] Date of Patent: Jul. 2, 1985

[54] APPARATUS FOR FORMING MIXTURES OF FLUIDS

[76] Inventors: William J. Harrison, 125, High St., Bottisham, Cambridgeshire; Andrew J. Reynolds, 10, Mill Hill End, Hilton, Huntingdon; Michael J. Kellaway, 127 Layston Park; Donald B. A. MacMichael, 17, Green St., both of Royston, Hertfordshire; Anne T. Miller, 7 North Cottages, Trumpington Rd., Cambridge, all of England

[21] Appl. No.: 513,415

[22] Filed: Jul. 14, 1983

[51] Int. Cl.³ .............................................. B65B 1/32
[52] U.S. Cl. ...................................... 141/83; 222/77; 222/108
[58] Field of Search .................. 222/55, 77, 510, 135, 222/144.5, 108; 177/14; 141/83

[56] References Cited

U.S. PATENT DOCUMENTS 3,557,847 1/1971 Hebel ................................. 222/77

FOREIGN PATENT DOCUMENTS

| 867962 | 5/1961 | United Kingdom . |
| 867963 | 5/1961 | United Kingdom . |
| 1021676 | 3/1966 | United Kingdom . |
| 1309094 | 3/1973 | United Kingdom . |
| 1433710 | 4/1976 | United Kingdom . |
| 1548965 | 7/1979 | United Kingdom . |
| 2039471 | 8/1980 | United Kingdom . |
| 2048825 | 12/1980 | United Kingdom . |

Primary Examiner—Stanley H. Tollberg
Attorney, Agent, or Firm—Howson and Howson

[57] ABSTRACT

An apparatus for metering required proportions of different fluid ingredients to make a required mixture (e.g. a colored paint) includes a rack of storage containers for the ingredients, each provided with a valve-controlled outlet and a receiving container mounted on a weighing device which is presentable to a chosen sequence of storage containers in turn to receive the required contribution from each. Metering of the necessary ingredient additions is effected automatically by a valve actuator carried by the support for the weighing device. Data processing control to optimize operation is described.

19 Claims, 7 Drawing Figures

APPARATUS FOR FORMING MIXTURES OF FLUIDS

TECHNICAL FIELD

This invention relates to forming mixtures of fluids particularly of viscous liquids such as paint. A wholesaler can not keep in stock all the shades of paint which he wishes to supply, most particularly for vehicle refinishing paint which has to match paint already on the vehicle. He keeps in stock a number of basic colored paints, for example 10 to 60 paints in all which can be mixed in proportions usually specified by the paint manufacturer to produce the shade of paint required. This system of mixing basic colored paints to produce a desired shade is also often used for decorative household paint. Mixing paints to form a correct shade is a time consuming procedure since the proportions of the basic colored paints have to be measured accurately. The paints are usually stored in cans arranged in a cabinet. The cans may be fitted with a lid adapted to form a pouring spout. The lid also usually has a stirrer passing through it since each basic paint must be stirred to ensure it is homogeneous before it is mixed to form the desired shade. The stirrers of all the cans may be kinematically linked and motor driven so that each basic paint is being stirred except when it is taken from the cabinet.

DISCUSSION OF PRIOR ART

Machines are known in which the cans of basic colored paint are arranged on a carousel which can be rotated manually or automatically to present successive selected cans at a mixing station. Such machines are described for example in British Pat. Nos. 867,962, 867,963, 1,021,676, 1,433,710 and 1,548,965 and British Patent Application No. 2,039,471. A carousel however takes up more space in a warehouse than a flat cabinet which can be arranged against a wall. Moreover relatively heavy machinery is required to move the carousel loaded with cans of paint, particularly if it is movable vertically to present tins stored on different shelves to the mixing station.

BRIEF STATEMENT OF INVENTION

An apparatus according to the invention for forming, in a receiving container, a mixture in selected proportions of fluid ingredients selected from a number of such fluid ingredients stored in an array of storage containers each adapted to dispense a respective fluid ingredient, comprises weighing means adapted to support and continuously monitor the weight of the receiving container, a movable support for the weighing means so that the receiving container supported thereby can be moved to receive ingredients from successive selected storage containers, means for initiating dispensing of an ingredient from a selected storage container when the weighing means and supported receiving container are in a position to receive fluid from that storage container and means for stopping that dispensing of fluid when a predetermined weight of that ingredient has been dispensed into the receiving container.

In an apparatus for forming mixtures of paints to achieve a desired shade, the storage containers are preferably paint cans adapted to dispense the paint therein so that a paint manufacturer can supply paint in the same cans to customers using or not using the apparatus of the invention. The apparatus preferably includes dispensing heads each of which fits onto the opened top of a paint can. The dispensing head has a dispensing outlet for the paint which can be opened by the means for initiating dispensing of paint. The dispensing outlet is preferably controlled by a valve which is opened by the means for initiating dispensing, so that dispensing of paint can be achieved without moving the paint can and dispensing head.

In one preferred arrangement, the storage containers are paint cans arranged substantially horizontally and each is fitted with a dispensing head which has its dispensing outlet facing generally downwards, so that the paint flows out under gravity when the dispensing outlet is opened. The dispensing outlet can for example be controlled by a valve mounted on a vertical spindle which can be raised to open the valve. Conveniently the spindle extends vertically through the dispensing head so that the valve can be opened and closed by means engaging with the top part of the spindle. Such means for raising the valve (initiating dispensing of paint) and lowering the valve (stopping the dispensing of paint) are preferably mounted on the movable support for the weighing means, although it can alternatively be mounted on the static framework of the apparatus.

The valve preferably comprises a cylindrical valve plug resting in a frusto-conical valve seat when the valve is closed, the cylindrical valve plug and the frusto-conical valve seat being substantially coaxial and the plug being arranged to move along its axis away from the valve seat to open the valve. Such a valve has the advantage that the flow of viscous fluid can be accurately controlled over a large range of flow rates through the valve, for example from 0.1 grams/second up to 200 grams/second or more. As the valve is opened, the size of the valve opening does not increase linearly with the axial distance moved by the cylindrical plug away from the frusto-conical valve seat. The valve opening increases only slowly when the cylindrical plug is moved within the cone of the valve seat to give accurate control at low flow, but high flow rates are possible when the plug is well clear of the valve seat.

The valve plug and seat are preferably arranged so that their contact line when the valve is closed is near the lower tip of the frusto-conical valve seat. This has two advantages. Firstly initial opening movements of the plug are within the cone of the valve seat giving more accurate control at low flow as described above. Secondly the area of the valve below the contact line which can be wetted by paint can be made very small so that dripping of paint after the valve is closed is minimised. The frusto-conical valve seat preferably protrudes downwards from the dispenser so that the contact line of the valve plug and seat is below the lowest level of paint in the dispenser. The valve spindle and plug are preferably biased towards the closed position, for example by a spring operating against the top of the dispenser. The valve can then be closed by disengaging the means for raising the valve from the spindle or otherwise ceasing to apply the lifting force. Alternatively the lifting means can drive the spindle downwards to stop dispensing, although biasing towards the closed position is preferred, to ensure that the valve is firmly closed when the dispenser is not in use.

The valve plug is preferably made of a low friction material such as polytetrafluoroethylene. In this case the cylindrical valve plug is generally self-seating in the valve seat, that is it will move to its lowest position in the valve seat without being stopped by friction even if the plug and spindle are not precisely aligned with the valve seat.

In dispensers having a downwardly facing outlet, the underside surface of the cylindrical valve plug is preferably recessed, most preferably over at least half its surface area, so that the lowest surface of the plug is defined by a narrow annulus. Paint will not generally wet the recessed face when the valve is opened so that the surface of the valve plug from which paint can drip when the valve is closed can be made very small. The frusto-conical valve seat is preferably formed so that it protrudes from the lower face of the dispenser and its lower tip surrounding the circular valve outlet is preferably narrow to minimise dripping of paint.

The movable support for the weighing means preferably carries means for engaging the valve spindle to rotate it as the weighing means is moved into position under a dispenser. For example a pawl mounted on the movable support may engage a ratchet on the top part of the valve spindle. This rotary motion ruptures any paint film which may be bonding the valve plug to its seat, so that the subsequent valve operation is smoother and more controllable.

A receptacle for drips of the fluid being dispensed is preferably positioned under the dispensing outlet of each storage container, the receptacle being movable along a path defined by guide means and having a wiping member arranged so that before and/or after dispensing of the fluid, the wiping member wipes away drips of fluid from the dispensing outlet. It is not essential that the wiping member has a wiping action at the dispensing outlet both when moving away from the dispenser before dispensing and when returning towards the dispenser after dispensing, although this will usually be the case. The movable support for the weighing means preferably includes means for engaging the drip receptacle to move it from its position under the dispensing outlet of the storage container as the receiving container is moved to the position in which the receiving container can receive fluid dispensed from the storage container. The apparatus preferably also includes means (for example springs), to return the drip receptacle to its position under the dispensing outlet when the receiving container is no longer in position for receiving fluid dispensed from that storage container.

The drip receptacle prevents drips of viscous liquid, for example paint, which have formed at the dispensing outlet from falling into the wrong container or from fouling the apparatus. The wiping member prevents the accumulation of dried paint at the dispensing outlet. When the drip receptacle is moved back into position after a paint dispensing operation, the wiping member removes freshly dispensed paint which has remained at the dispensing outlet, any drips being retained in the drip receptacle. There is thus much less chance of paint hardening at the dispensing outlet and blocking it sufficiently to give an irregular flow during the next dispensing. When the drip receptacle is moved away from the dispensing outlet before dispensing, the wiping member helps to remove any small amount of dry paint which has formed at the dispensing outlet, dropping it into the drip receptacle so that the paint dispensed is not marred by flakes of dried paint which might not redissolve.

The drip receptacle is preferably in the form of a dish having a substantially flat base. The dish is preferably arranged so that there is only a narrow gap between the top of the side(s) of the dish and the bottom of the dispenser. The drip receptacle thus forms a compartment around the dispensing outlet when dispensing is not taking place. When the fluid to be dispensed is a solvent-based material such as paint, an atmosphere rich in solvent vapor is thus maintained around the dispensing outlet. The drip receptacle should have sufficient depth to give adequate clearance between the dispensing outlet and paint which has accumulated in the receptacle. Eventually this paint has to be discarded. The drip receptacle can be made inexpensive and disposable, for example of plastics material, or it may have a disposable liner for the base, preferably of an absorbent material, such as absorbent paper. Alternatively the dish can be lined with a material not readily wetted by paint, for example polytetrafluoroethylene or silicone, so that collected paint is easily removed therefrom.

The wiping member can be any of a wide variety of types; for example it can be a wire, blade, brush or fibrous material or an absorbent material such as a sponge. It is generally arranged across the top of the drip receptacle. A brush can be fixed relative to the receptacle or can be in the form of a roller which rotates as the drip receptacle moves. A fibrous material can for example be a slightly abrasive felt arranged on a roller. The preferred wiping member is a wire which can be arranged so that its springiness urges it against the dispensing outlet to apply a wiping pressure. The wire is preferably mounted at an oblique angle to the direction of travel of the drip receptacle. It has been found that a wire perpendicular to the direction of travel may smear a very thin film of paint across the dispensing outlet. While such a thin film is insufficient to permanently block the outlet, it may lead to an irregular flow of paint, giving rise to difficulties in dispensing an accurately measured amount of paint. The wire is preferably mounted so that it is easily detachable from the drip receptacle.

The means for supporting the drip receptacle in its position under the dispensing outlet preferably also forms the guide means for the movement of the drip receptacle. For example the sides of the drip receptacle may have externally mounted guides forming a channel in which supporting bars can be arranged to slide. The drip receptacle can alternatively be arranged to move between guide rails on a supporting structure.

The apparatus of the invention is particularly suitable for programmed control. A data processor can store, as input information, the position of each storage container and the basic colored paint it contains. Information can be fed to the data processor concerning the basic colored paints to be mixed and the amount of each required to form a desired shade of paint. In a preferred fully automated apparatus, the data processor has a store of information concerning the basic colored paints and their relative proportions required to make any of the shades of paint offered by a paint manufacturer so that the only manual input of information needed for each dispensing operation is a code for the shade required and the size of the receiving container to be filled. Information on the weights of each basic colored paint to be mixed can alternatively be fed to the data processor by manual keyboard or by punched card or bar code.

The data processor preferably controls the movement of the weighing means and its support to successive storage containers containing the basic colored paints required. The presence of the weighing means and receiving container beneath a desired storage container may be ascertained by the data processor from information fed thereto concerning the position of each storage container and of the weighing means or by a sensing device on the weighing means or its support or on the storage container. When this has been ascertained, the data processor emits a signal to the means for initiating dispensing of the paint. The data processor records the weight of the receiving container before dispensing and calculates the required weight of that container after dispensing of that basic colored paint. The weighing means continuously monitors the weight of the receiving container during dispensing of the paint and passes this information to the data processor which compares it with the required weight of the receiving container. When the receiving container reaches the required weight, the data processor emits a signal to operate means for stopping dispensing of the paint. The data processor can, if desired, control the rate of dispensing of the paint according to the weight of the particular basic colored paint required. For example it can open a dispensing valve only a small extent to give a low dispensing rate of basic colored paint which is to be used in a small amount so that the weight of that paint dispensed can be controlled more accurately. The data processor may control the degree to which the valve is opened during the dispensing operation in response to the measured rate of increase in weight of the receiving container during that dispensing operation.

The rate at which paint is dispensed through a given valve opening depends mainly on the viscosity of the paint (which itself depends on the composition of the paint and on the ambient temperature at the dispensing apparatus) and on the head of paint in the storage container above the valve. When paint is to be dispensed, the data processor is given information on the weight of paint to be dispensed and measures the weight of the receiving container before dispensing and hence calculates the target weight of the receiving container after dispensing. Dispensing is then initiated by actuating the automatic opening means to open the valve plug a fixed amount. This is preferably arranged to correspond to a desired rate of flow of a relatively low viscosity paint from a full storage container on a warm day. The degree to which the valve is opened in this initial stage of dispensing can be the same for every separate dispensing operation, although the data processor may control the opening of the valve to be less, if only a small amount of paint is to be dispensed. The weighing means continuously measures the weight of the receiving container and feeds this information to the data processor. The weighing means can for example be a quartz fiber balance transmitting weight measurements at time intervals of 0.1–0.5 second for example every 0.2 second.

From these successive weight measurements and the time between them, the data processor can calculate the flow rate of the paint dispensed through the valve. Dispensing is preferably allowed to take place with the initial valve opening for a time sufficient to allow a steady flow to develop. This time is preferably at least 1 second and can be up to 5 seconds or longer. The data processor is of course still monitoring the weight of the receiving container compared to the target weight and can close the valve in one operation when the target weight is reached, or by degrees as the target weight is approached. After allowing time for a steady flow to develop, the flow rate is measured and compared with a desired flow rate stored in or calculated by the data processor. In most cases the measured flow rate will be less than the desired flow rate because the paint is cold or has a relatively high viscosity or the storage container is not full. The data processor then calculates the factor by which the flow has to be accelerated to achieve the desired flow rate and actuates the automatic opening means to further open the valve by an appropriate amount.

For most types of valve, including the preferred valve having a cylindrical valve plug in a conical valve seat, the flow rate of a given fluid through the valve is not in linear proportion to the distance moved by the valve plug away from the valve seat. This can give advantages in accuracy since a small valve opening giving a low flow of paint (individual drips) can be achieved without the need for a very sensitive control on the distance by which the valve spindle and plug are raised, while rapid flow can still be achieved by a larger valve opening. The data processor preferably stores information on the variation of flow rate with movement of the valve plug so that it can control the automatic opening means to open the valve to accelerate the flow of paint by the calculated factor.

When the acceleration factor has been calculated and the valve has been opened to give the appropriate accelerated flow rate of paint, dispensing may continue at that flow rate until the target weight of the receiving container is approached or reached. Alternatively the data processor can continuously measure the flow rate of the paint and adjust the valve opening and hence the flow rate with each measurement if needed or at selected time intervals. Moreover the desired flow rate of the paint can be a fixed pre-determined flow rate or can depend on the difference between the target weight and the current measured weight of the receiving container so that the flow rate is continuously adjusted and is gradually reduced as the target weight is approached.

Whether or not the flow rate is continuously adjusted in this manner it is preferably reduced as the target weight is approached. For example the data processor can be programmed to partly close the valve when the measured weight is within a certain weight of the target weight. Dispensing is then continued slowly to give increased accuracy and the valve is closed when the weight of the receiving container equals the target weight or is within a known tolerance of it to allow for paint which has passed the valve opening but has not yet reached the receiving container.

BRIEF DESCRIPTION OF DRAWINGS

One embodiment of apparatus for forming mixtures of paints will now be described, by way of example, with reference to the accompanying drawings, of which.

DESCRIPTION OF PREFERRED EMBODIMENT

Figure 1:
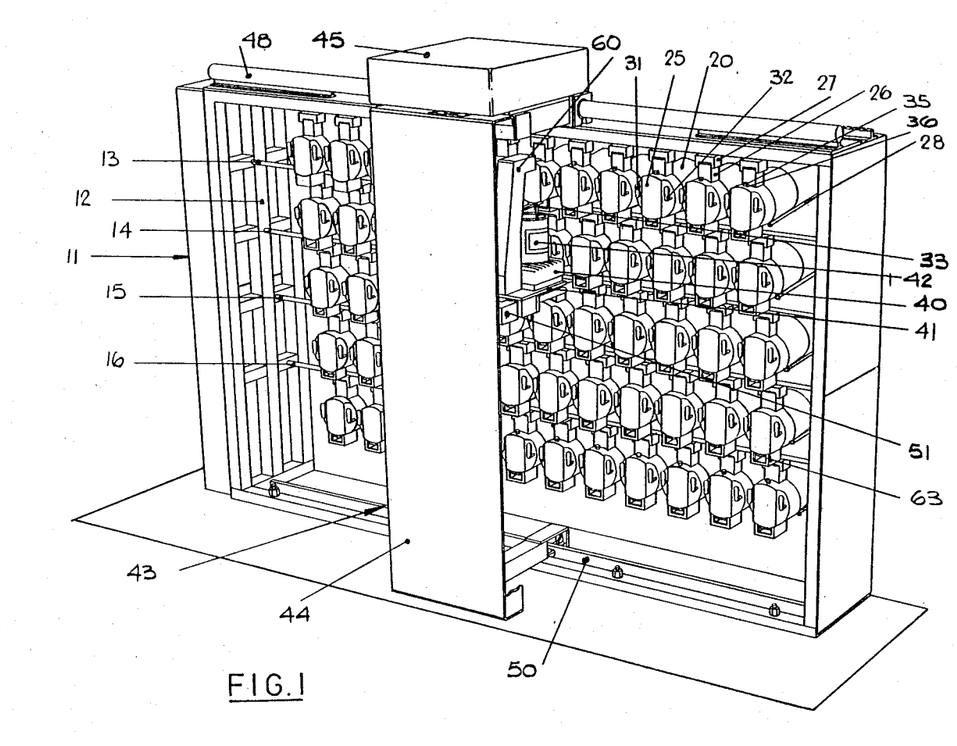
FIG. 1 is a front perspective view of the apparatus.
Figure 2:
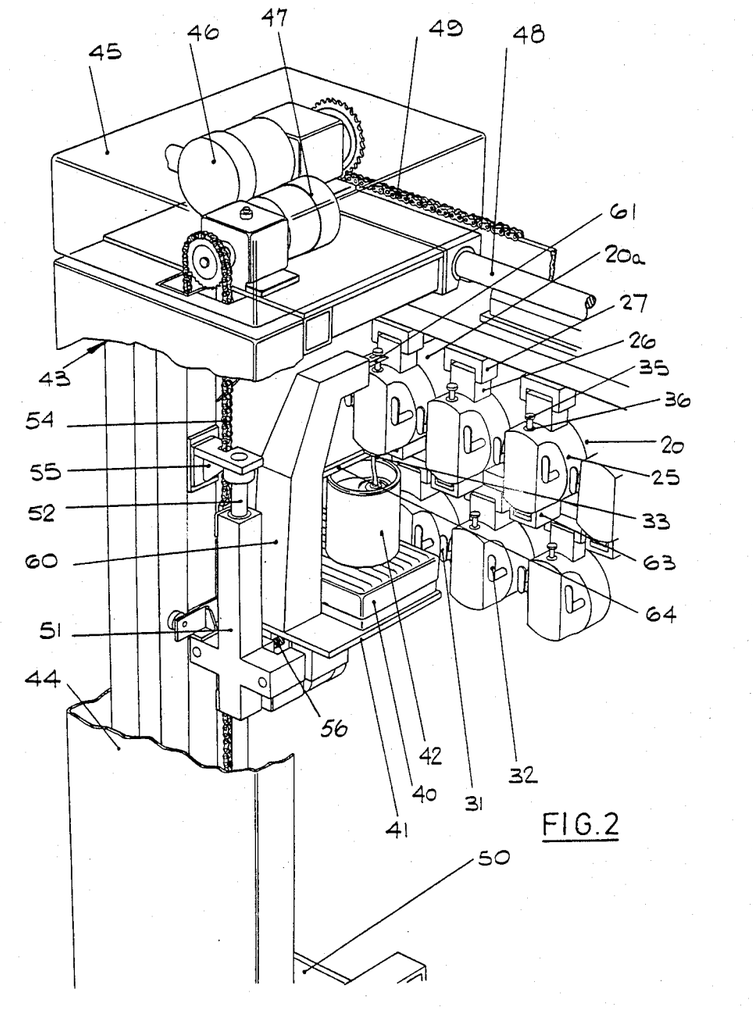
FIG. 2 is a front perspective view on an enlarged scale, of a partly cut away portion of the apparatus of FIG. 1, showing paint being dispensed from a selected storage container.

The apparatus illustrated in FIGS. 1 and 2 comprises a cabinet 11 having a framework 12 supporting racks 13 to 16. A number of paint cans (storage containers) such as 20 and 20a are supported in rows by each rack. The uppermost rack is not shown in FIG. 1, but can be seen in FIG. 2. Each rack (such as 14) is positioned slightly to the rear of the rack (13) above.

Each paint can (such as 20) is fitted with a dispensing head 25 clamped over the open top of the paint can by wing clamps 31 and 32. The dispensing head 25 is formed with a boss 26 through which a bolt or pin passes to fix it to a supporting bracket 27 mounted on the rack above. Each paint can rests on two supporting rods at each side of it, one rod 28 being visible at the end of each horizontal row in FIG. 1. Each paint can is preferably supported as shown, so that it tilts slightly downwards towards its dispensing head 25.

Each dispensing head 25 (see FIG. 4) has a dispensing outlet 33 controlled by a valve which allows the paint to flow under gravity through the outlet 33 when the valve is open. The dispenser valve comprises a circular cylindrical valve plug 81 and a fursto-conical valve seat 82. The valve plug 81 is preferably formed of a low friction material such as polytetrafluoroethylene (PTFE) and the lower circumference 83 of the valve plug is rounded off so that the valve plug 81 is self-seating in the valve seat 82. The valve seat 82 is preferably made of metal, for example stainless steel, and is fastened to the body of the dispensing head 25 by mating screw threads 84. The valve plug 81 is movable vertically by a spindle 35 which passes through the upper surface of the dispensing head 25 through a gland 36. The gland 36 is preferably made of a material which resists wetting by paint for example PTFE or a silicone to prevent paint sticking to the spindle and/or the gland and thereby impeding their relative movement. The spindle 35 can also be made of a material which resists wetting or can alternatively be made of a polished, relatively low friction, metal for example stainless steel. The upper end of the spindle 35 is formed with a handle 37 which can be engaged by an automatic device to raise the valve plug 81 and hence open the valve. A spring 38 surrounds the spindle 35 within the dispensing head 25. The spring operates against the inner surface of the top of the dispensing head 25 and against the top of the valve plug 81 so that the valve plug is biased towards the closed position. The spring 38 rapidly closes the valve when the force lifting the spindle is removed.

Figure 4:
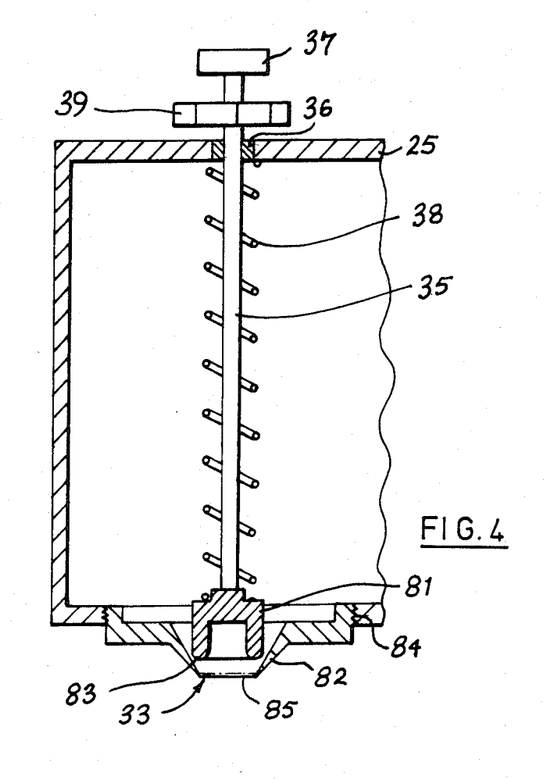
FIG. 4 is an enlarged cross-section of the dispensing head of the storage container of FIG. 3 taken along the line IV-IV thereof.

FIG. 4 shows the valve in a partially open position. The valve plug 81 is raised from its lowest position which is indicated by a chain line 85. As the valve is opened, the area of the valve opening does not increase linearly with the vertical distance moved by the valve plug 81. The valve opening is initially small as the valve plug 81 is raised, so that a low flow rate of paint (individual drips) can be achieved without the need for a very sensitive control on the distance moved by the automatic device employed for raising the spindle 35. As the valve plug 81 is raised further, the rate of opening of the valve increases and when the lower surface of the valve plug 81 is above the upper surface of the valve seat 82, rapid flow is achieved.

Figure 6:
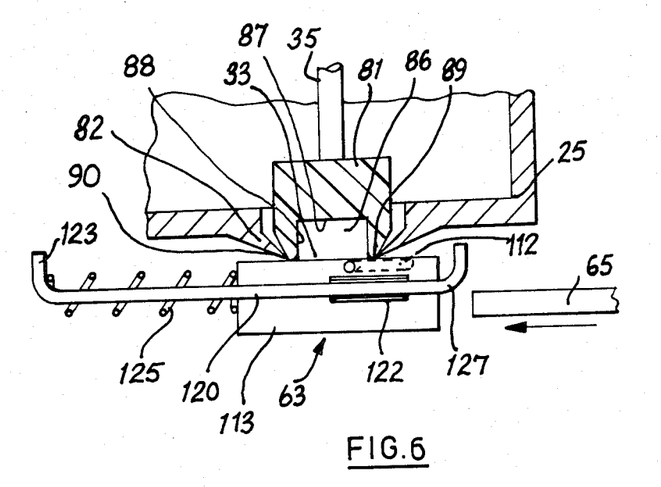
FIG. 6 is a side elevation, partly in section, showing the drip receptacle of FIG. 5 in position under the outlet of a paint dispenser (of FIG. 4), which is shown in enlarged cross-section.

FIG. 6 shows the valve plug 81 and the valve seat 82 with the valve in the closed position. The valve plug 81 is formed with a recess 86 over most of the area of its lower face. When the valve plug 81 is raised to open the valve, paint generally does not enter the recess 86 and the circular recessed surface 87 and cylindrical inner wall 88 will not drip paint after the valve is closed. The only downward facing surface which becomes wetted by paint and can drip, is the narrow annular surface 89. The frusto-conical valve seat 82 protrudes downwards from the main body of the dispensing head 25 and its cross-section tapers to a narrow annular tip 90 so that the risk of dripping from a downwardly facing surface wetted by paint is again minimised.

The apparatus (see FIG. 2) includes a weighing means 40 mounted on a support 41 and adapted to continuously monitor the weight of a receiving can 42. The weighing means is preferably of a type which is not sensitive to the vibrations caused by its movement so that hardly any delay is needed following a move before it can start monitoring the weight of the receiving can. A suitable weighing means is a quartz fiber balance. The support 41 is independently movable in three mutually perpendicular directions. A movable assembly 43, with its shield 44 and top housing 45 enclosing electric motors 46 and 47, is movable parallel to the racks 13 to 16 on linear bearings along an upper rail 48. The movable assembly 43 is driven by the motor 46 through a chain 49 anchored to the framework 12 of the cabinet 11. The lower part of the assembly 43 is constrained to move linearly along a lower rail 50. A carriage 51 is movable vertically on linear bearings along a vertical rail 52 and is driven therealong by the motor 47 through a chain 54. The vertical rail 52 is attached to the movable assembly 43 by a top bracket 55 and a bottom bracket (not shown). The support 41 is movable away from or towards the carriage 51 on linear bearings by an electrically driven screw mechanism 56. The movement of the support 41 is preferably controlled so that its movement away from the carriage 51 towards the dispensing head 25 is made after it has been positioned opposite the desired paint can 20a.

The support 41 for the weighing means 40 has an arm 60 terminating in a fork 61 and is adapted to engage the handle 37 at the top of the spindle 35 of the valve of the dispensing head 25. The fork 61 is pivotally mounted on the arm 60 and can be driven upwardly to raise the spindle 35. The drive mechanism may incorporate a device which senses when the fork 61 first contacts the handle 37, so that the distance by which any given valve has been raised can be determined. The pivoting fork 61 is biased towards its lowest position so that when the fork is not being driven upwards, the spring on the spindle 35 rapidly closes the valve.

The arm 60 also carried a spring-urged pawl (not shown but located just below the fork 61) adapted to engage a ratchet 39 (see FIGS. 3 and 4) fixed to the upper portion of the spindle 35. As the support 41 is moved towards a dispensing head 25, the pawl engages the ratchet 39 to rotate the spindle 35 and valve plug 81 before the fork 61 engages the handle 37. This rotary movement ruptures any paint film which may be bonding the valve plug 81 to the valve seat 82 or the spindle 35 to the gland 36.

Figure 5:
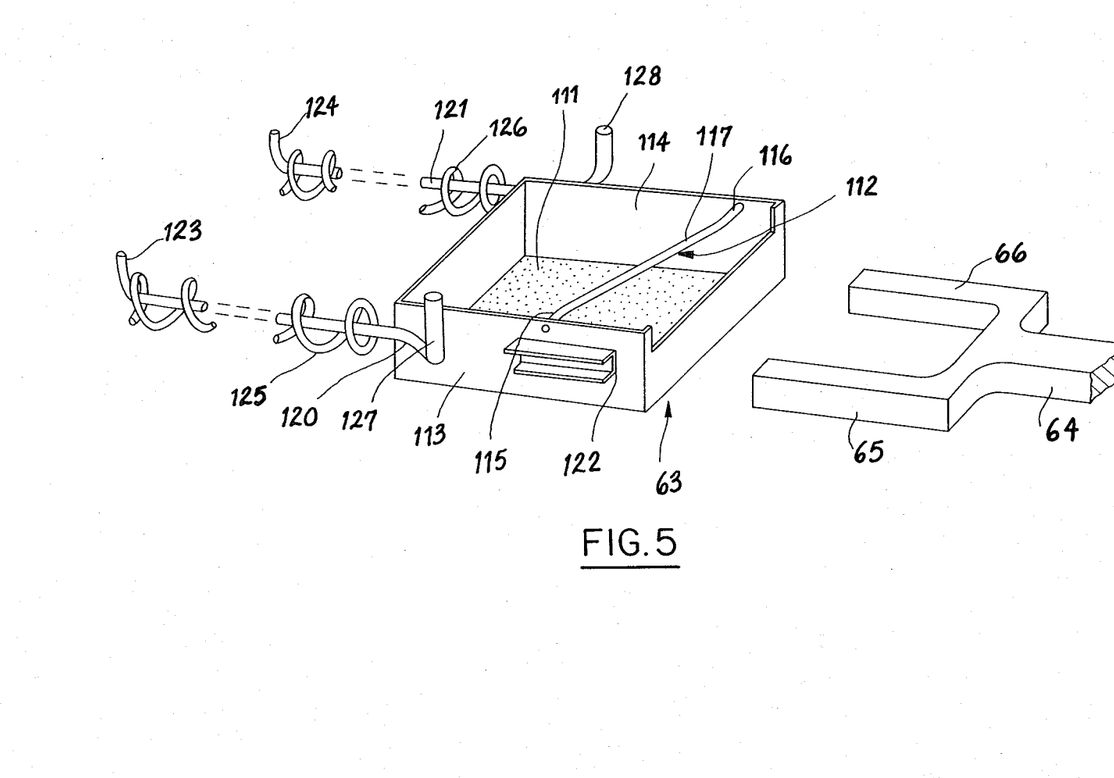
FIG. 5 is an exploded perspective view of one of the drip receptacles shown in FIGS. 1 and 2 together with the means for moving it in use.

When a particular paint can, such as 20, is not dispensing paint, its dispensing outlet 33 is surrounded by a drip receptacle 63 in the general form of a dish (see FIGS. 5 and 6). The arm 60 of the support 41 carries a rigid bar 64 terminating in two prongs 65 and 66 adapted to contact the drip receptacle 63.

The drip receptacle 63 is in the form of a dish having a flat base (covered with a removable liner 111, for example of absorbent paper) and vertical walls 113, 114. A wire 112 is fixed to extend between the tops of opposite side walls 113 and 114 of drip receptacle 63 to act as a wiping member. The wire 112 is formed with short portions 115 and 116 emerging perpendicularly from the side walls 113 and 114, respectively, and a central wiping portion 117 arranged obliquely across the top of the drip receptacle. The drip receptacle 63 is supported on rails 120 and 121 which act as guide means when the receptacle 63 is moved. The rails 120 and 121 fit into guide channels 122 formed on the side walls 113 and 114 of the receptacle 63. The rails 120 and 121 are fixed to a rack such as 13 at 123 and 124, respectively, and are provided with springs 125 and 126, respectively. The free ends 127 and 128 of the rails 120 and 121 are bent upwards and outwards so that the drip receptacle 63 can be easily fitted on and off the guide rails 120 and 121 for example if the disposable liner 111 needs to be changed.

When the drip receptacle 63 is positioned under a dispenser 25, the tops of the side walls 113 and 114 of the drip receptacle 63 are substantially level with the lower tip 90 of the valve seat 33 so that the drip receptacle 63, in the forward position shown in FIG. 6, to some extent forms an isolated compartment surrounding the dispensing outlet 33 and the portion 117 of the wire 112 is at a level to wipe the lower surface of the dispensing outlet.

Figure 3:
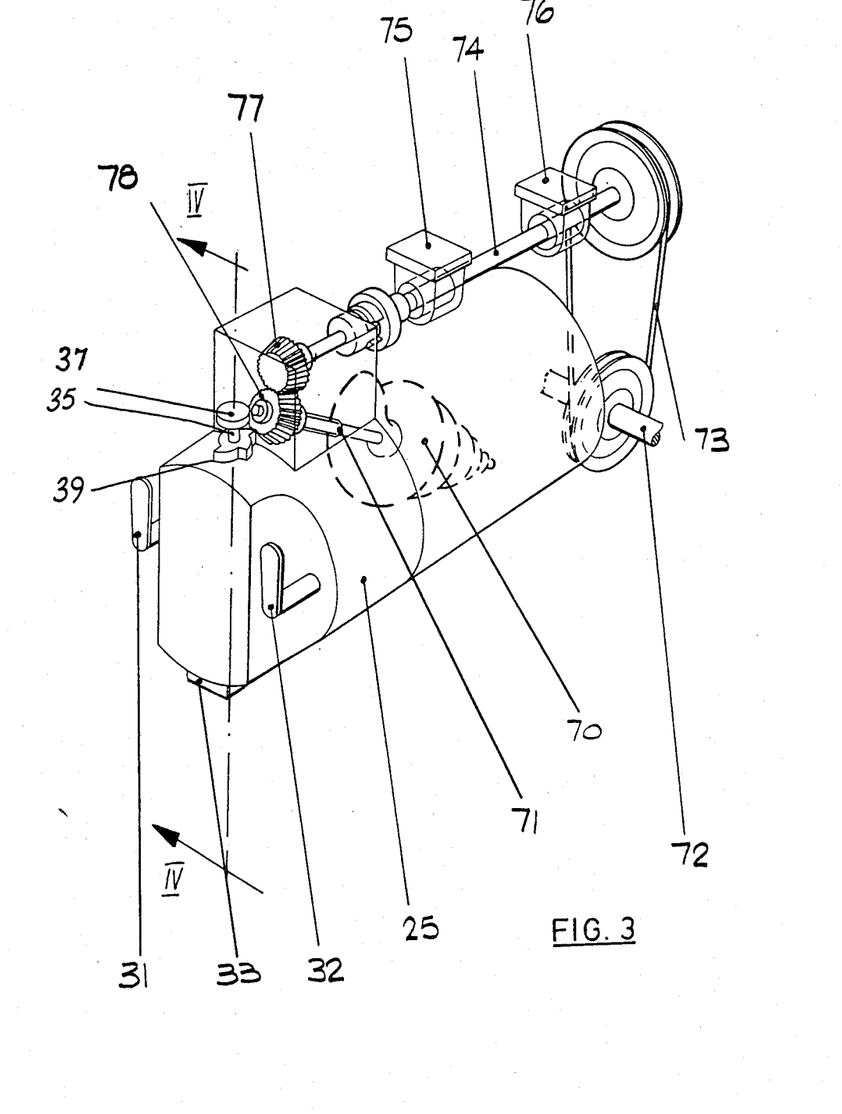
FIG. 3 is a perspective view, partly cut away, of one of the storage containers of FIGS. 1 and 2.

Each paint can (20) contains a stirrer 70 as seen in FIG. 3. All the stirrers 70 are driven from the same electric motor (not shown) and are operated intermittently, for example every hour, so that any paint dispensed is well stirred. The stirrer 70 shown is in the shape of a spiral scroll but many other shapes are suitable, for example a V-bladed stirrer. Each stirrer (70) passes through a bush (71) in the dispensing head 25. All the stirrers 70 in the row of paint cans on one rack are driven through a common shaft 72 passing behind the row of cans. A belt 73 driven by the shaft 72 drives a shaft 74 substantially parallel to the axis of each paint can. Each shaft 74 passes through supports 75 and 76 and drives the respective stirrer through bevel gears 77 and 78.

In use of the apparatus shown, dispensing of paint is controlled by programmed instructions. A data processor selects the paint cans (20) which are needed to dispense paint to be mixed together to form a desired shade formulation in the receiving can 42 and controls the movement of the weighing means 40 to the vicinity of each of these paint cans. With the support 41 retracted near to the carriage 51, the assembly 43 is moved laterally along the rails 48 and 50 and vertically along the rail 52 until it is positioned opposite the desired paint can (say the can 20a in FIG. 2). The lateral and vertical movements may be successive or simultaneous. The support 41 is then moved away from the carriage 51 until the receiving can 42 is positioned under the dispensing outlet 33. As the support 41 is moved towards the dispensing head 25, the ratchet 39 is partially turned and the bar 64 pushes the appropriate drip receptacle 63 back so that it is clear of the respective dispensing outlet 33. The wire 117 included in the drip receptacle 63 wipes the lower surface of the dispensing outlet 33 (that is the lower tip 90 of the valve seat 82 and the rim 89 of valve plug 81). This wiping action helps to remove any small amount of dry paint which has formed on these surfaces, dropping it into drip receptacle 63.

When the data processor registers that the position of the weighing means 40, and hence the receiving can 42, is correctly under the required dispensing head 25, dispensing of paint is initiated by raising the fork 61 now engaging the handle 37 of the appropriate spindle 35, so that the valve plug 81 is moved upwards to open the dispensing outlet 33. The drip receptacle 63 is clear of the dispensing outlet 33 during dispensing and the paint is dispensed by gravity feed, falling between the prongs 65 and 66.

Figure 7:
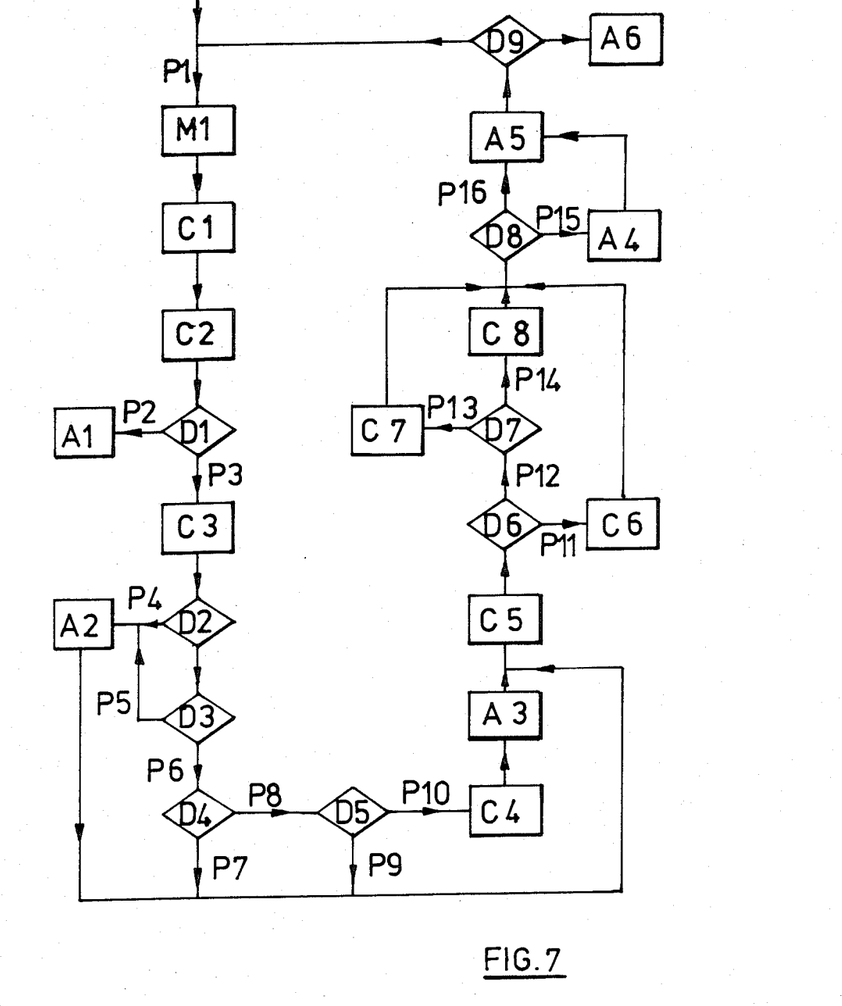
FIG. 7 is an algorithm showing the process steps used in the apparatus of FIGS. 1 and 2 during a dispensing operation controlled by a data processor.

The procedure for dispensing is as indicated in FIG. 7. The data processor first circulates the target weight for the receiving can 42 by adding the current weight of the receiving can and the weight of paint required to be dispensed from the particular storage container (say 20a). The data processor then follows the programme indicated by path P1. A weight measurement M1 is recorded and two calculations C1 and C2 are made. C1 calculates the actual flow rate from the difference between the current weight measured at M1 and the previous weight measurement. C2 calculates the further weight of paint required, that is the difference between the target weight and the current weight measured at M1. (Calculations C1 and C2 are superfluous at the start of dispensing except as a check that there is no unexpected flow). The data processor then checks at D1 whether the difference measured at C2 is less than the tolerance of the weighing system. If it is, the data processor follows a path P2 to take action A1 to actuate the fork 61 to close the valve. This is the end of the dispensing process. If check D1 shows that continued dispensing of paint is required, the programme follows path P3 and calculates at C3 the desired rate of flow of paint, which will be high if the difference measured at C2 is large but will be low, to give good dispensing accuracy, if the difference measured at C2 is small.

The programme checks at D2 whether the time elapsed since the start of dispensing from that container is more or less than the time allowed to develop a steady flow, for example 3 seconds. If it is more, the programme makes a further check D3 to determine whether the weight difference measured at C2 is more or less than a predetermined lower amount, for example 10 grams. If the time is less than the limit in D2, or the weight difference is less than the limit in D3, the programme follows path P4 and P5 to operate a flag A2 which prevents the data processor from calculating a factor for accelerating the flow.

If the checks D2 and D3 show that the elapsed time and the weight difference are each more than the appropriate limit, the programme follows path P6 to make a further check D4 whether dispensing is already being carried out under a calculated acceleration factor. If it is, the programme follows path P7 and makes no further calculation of an acceleration factor. If it is not, the programme follows path P8 and makes a further check D5 on the ratio of the flow required (calculated at C3) to the measured flow (calculated at C1). If this ratio is above a predetermined high limit, the programme follows path P9 and will not accelerate the flow (too high a ratio probably indicates that the measured flow is nil or very small despite the time control at D2). If the ratio of required flow to measured flow is less than this maximum, the programme follows path P10 and calculates at C4 the factor by which flow must be accelerated. The data processor then actuates a flag at A3 which allows acceleration of the flow to take place and informs check D4 that accelerated flow is taking place. The programme then makes a final calculation C5 of the flow required which will be accelerated flow if the programme has followed path P10 but will be the existing flow if the programme follows path P4, P5, P7 or P9.

As described above, the check D4 operates to give a single accelerated flow rate for a given dispensing cycle until the target weight is approached. Alternatively the check D4 can be a time check so that the programme follows path P7 if it is less than a given time since the last adjustment to the flow rate, but follows path P8 otherwise. This given time is preferably more than one second as unstable flow may result if too rapid adjustments are made. The acceleration factor for the flow rate is preferably recalculated every 2 to 10 second, for example every 4 to 5 seconds.

As mentioned above, the flow rate through the preferred type of valve having a cylindrical plug 81 resting in a frusto-conical valve seat 82 is not linearly proportional to the axial distance moved by the plug away from the seat. A good approximation however can be obtained by supposing that there are three modes of flow through the valve depending on how far it is open, each of which can be represented by a linear equation. The programme thus first checks at D6 whether the flow required is less than a given low level, for example 4 grams per second. If it is, the programme follows path P11 and the required valve opening is calculated at C6 using an equation for flow rate against distance moved by the valve spindle 35 appropriate for a slight opening of the valve. If the flow required is higher than this, the programme follows path P14 and the valve opening is calculated at C8 according to an appropriate equation for a valve opening towards its full extent. The programme then incorporates a further check at D8 in case the required opening of the valve calculated is greater than its maximum. If it is, then the programme follows path P15 and introduces a control at A4 that the valve should be opened by its maximum extent. If the calculated opening is less than the maximum, the programme follows path P16; in either case the next step is that the data processor actuates the fork 61 to open the valve by the calculated amount at A5.

The programme incorporates a check at D9 on the total time taken to dispense paint from a particular storage container 20a. If this time exceeds a predetermined limit, the programme follows path P17 and the data processor in step A6 actuates the fork 61 to shut the valve completely and emits a warning signal. The most probable reason for exceeding the time limit is no flow of paint either because the storage container 20a is empty or because the dispensing outlet 33 has become blocked. Further implementation of the programme is postponed until this has been put right.

If the elapsed time is within the pre-set limit, the programme follows path P18 and receives another weight measurement from the weighing means 40 in the step M1. The cycle is then repeated dispensing from the next container (20) in the sequence.

When the fork 61 has closed the valve at step A1 of FIG. 7 after a dispensing operation, the weighing means 40 and its supported receiving can 42 are moved on, after a short delay to allow paint to drain from the valve outlet 33 into the can 42. The weighing means 40 and its support 41 initially move, after a dispensing operation, back towards the carriage 51. As they are so retracted, the pawl (not shown) on the arm 60 snaps past the ratchet 39 without further rotating it and the drip receptacle 63 is urged by the springs 125 and 126 back along its guide rails 120 and 121 until it returns to its position directly under the dispensing outlet 33. As it does so, the wire 112 again wipes the surfaces 89 and 90 of the dispensing outlet, removing any freshly dispensed paint adhering thereto. Any drips falling from the wire 112 are retained in the drip receptacle 63.

This dispensing process is repeated until all the basic paints required to mix a desired shade formulation have been dispensed into the can 42. The data processor may emit a visible and/or audible signal indicating that dispensing is complete so that the receiving can 42 can be removed from the weighing means 40.

The data processor is also preferably programmed to emit a warning signal when a particular paint can (20) is practically empty. The data processor may store information relating to the total weight of paint dispensed from each paint can since it was last renewed, or it may be programmed to emit the warning signal when substantially no flow of paint occurs from a paint can that has its dispensing valve opened. Any empty paint can (20) can then be removed from the apparatus, together with its dispensing head 25 and stirrer 70, while disengaging the drive between the gears 77 and 78. The dispensing head 25 is then removed together with the stirrer (70) from the empty can (20) by undoing the clamps 31 and 32 and the dispensing head is clamped onto a fresh can of the required basic paint. The new can can then be rapidly placed in its correct position in the cabinet 11.

What is claimed is:

1. An apparatus for forming, in a receiving container a mixture in selected proportions of fluid ingredients selected from a number of such fluid ingredients stored in an array of storage containers each adapted to dispense a respective fluid ingredient, comprising weighing means adapted to support and continuously monitor the weight of the receiving container, a movable support for the weighing means so that a receiving container supported thereby can be moved to receive ingredients from successive selected storage containers, means for initiating dispensing of an ingredient from a selected storage container when the weighing means and supported receiving container are in a position to receive fluid from that storage container, means for stopping that dispensing of fluid when a predetermined weight of that ingredient has been dispensed into the receiving container, and a data processor which controls the movement of the weighing means and its support to successive storage containers, ascertains the correct disposition of the weighing means and receiving container relative to the desired storage container, emits a signal to the means for initiating of the respective fluid ingredient when such correct disposition has been ascertained, is adapted to receive information of the weight of the receiving container from the weighing means during dispensing of the ingredient, and emits a signal to operate means for stopping dispensing of the fluid when the receiving container has reached the required weight.

2. An apparatus according to claim 1, for forming mixtures of paint, in which
the storage containers are paint cans,
a dispensing head having a dispensing outlet for paint is fitted to each can,
a valve is provided for each outlet which can be opened by the initiating dispensing means whereby dispensing of paint can be effected without moving the paint can and dispensing head.

3. An apparatus according to claim 2, in which the dispensing head has its dispensing outlet facing generally downwards and the valve is mounted on a substantially vertical spindle, means being provided on the movable support for the weighing means to engage the spindle to raise the valve to initiate dispensing of paint and to lower the valve to stop the dispensing of paint.

4. An apparatus according to claim 1, in which the dispensing of each fluid ingredient is controlled by a valve comprising a cylindrical valve plug resting on a frusto-conical valve seat when the valve is closed, the cylindrical valve plug and the frusto-conical valve seat being substantially coaxial and the plug being arranged to move along its axis away from the valve seat to open the valve.

5. An apparatus according to claim 4, in which the valve plug and valve seat are arranged so that their contact line when the valve is closed is near the lower tip of the frusto-conical valve seat.

6. An apparatus according to claim 4, in which the underside surface of the valve plug is recessed over at least half its surface area.

7. An apparatus according to claim 3, in which means is provided on the movable support for the weighing means for rotating the valve spindle and plug so that the valve spindle and plug are rotated as the weighing means and its support are moved into position under the dispensing outlet.

8. An apparatus according to claim 3, in which a receptacle for drips of paint is positioned under the dispensing outlet of each storage container, the receptacle being movable along a path defined by guide means and having a wiping member arranged so that when the receptacle is moved along the path defined by the guide means before and/or after dispensing of paint, the wiping member wipes away drips of paint from the dispensing outlet.

9. An apparatus according to claim 8, in which the movable support for the weighing means includes means for engaging the drip receptacle to move it along the said path as the weighing means is moved into position under the dispensing outlet.

10. An apparatus according to claim 8, in which the drip receptacle is in the form of a dish having a substantially flat base arranged so that there is only a narrow gap between the top of the sides of the dish and the dispensing outlet so that the drip receptacle forms a compartment around the dispensing outlet when dispensing is not taking place.

11. An apparatus according to claim 8, in which the wiping member is a wire.

12. An apparatus according to claim 1, in which dispensing of each fluid ingredient is controlled by a valve and the data processor controls the degree to which the valve is opened during the dispensing operation in response to the measured rate of increase in weight of the receiving container during that dispensing operation and closes the valve to stop dispensing of fluid when the receiving container has reached the desired weight known from information stored by the data processor.

13. An apparatus for forming, in a receiving container a mixture in selected proportions of fluid ingredients selected from a number of such fluid ingredients stored in an array of storage containers each adapted to dispense a respective fluid ingredient, comprising
weighing means adapted to support and continuously monitor the weight of the receiving container,
a movable support for the weighing means so that a receiving container supported thereby can be moved to receive ingredients from successive selected storage containers,
means for initiating dispensing of an ingredient from a selected storage container when the weighing means and supported receiving container are in a position to receive fluid from that storage container,
means for stopping that dispensing of fluid when a predetermined weight of that ingredient has been dispensed into the receiving container, and in which
the storage containers are paint cans,
a dispensing head having a dispensing outlet for paint is fitted to each can,
a valve is provided for each outlet which can be opened by the initiating dispensing means whereby dispensing of paint can be effected without moving the paint can and dispensing head, and
the dispensing head has its dispensing outlet facing generally downwards and the valve is mounted on a substantially vertical spindle, means being provided on the movable support for the weighing means to engage the spindle to raise the valve to initiate dispensing of paint and to lower the valve to stop the dispensing of paint.

14. An apparatus according to claim 13, in which means is provided on the movable support for the weighing means for rotating the valve spindle and plug so that the valve spindle and plug are rotated as the weighing means and its support are moved into position under the dispensing outlet.

15. An apparatus according to claim 13, in which a receptacle for drips of paint is positioned under the dispensing outlet of each storage container, the receptacle being movable along a path defined by guide means and having a wiping member arranged so that when the receptacle is moved along the path defined by the guide means before and/or after dispensing of paint, the wiping member wipes away drips of paint from the dispensing outlet.

16. An apparatus according to claim 15, in which the movable support for the weighing means includes means for engaging the drip receptacle to move it along the said path as the weighing means is moved into position under the dispensing outlet.

17. An apparatus according to claim 15, in which the drip receptacle is in the form of a dish having a substantially flat base arranged so that there is only a narrow gap between the top of the sides of the dish and the dispensing outlet so that the drip receptacle forms a compartment around the dispensing outlet when dispensing is not taking place.

18. An apparatus according to claim 15, in which the wiping member is a wire.

19. An apparatus for forming, in a receiving container a mixture in selected proportions of fluid ingredients selected from a number of such fluid ingredients stored in an array of storage containers each adapted to dispense a respective fluid ingredient, comprising
- weighing means adapted to support and continuously monitor the weight of the receiving container,
- a movable support for the weighing means so that a receiving container supported thereby can be moved to receive ingredients from successive selected storage containers,
- means for initiating dispensing of an ingredient from a selected storage container when the weighing means and supported receiving container are in a position to receive fluid from that storage container, and
- means for stopping that dispensing of fluid when a predetermined weight of that ingredient has been dispensed into the receiving container, and
- in which dispensing is controlled by a data processor which continually receives, during dispensing, information from the weighing means of the weight of the receiving container and controls the degree to which the valve is opened during the dispensing operation in response to the measured rate of increase in weight of the receiving container during that dispensing operation and closes the valve to stop dispensing of fluid when the receiving container has reached the desired weight known from information stored by the data processor.

* * * * *